United States Patent [19]

Jarrett

[11] Patent Number: 4,872,482

[45] Date of Patent: Oct. 10, 1989

[54] REMOTELY CONTROLLED OPERATOR FOR GAS CYLINDER VALVE

[75] Inventor: Jawrence P. Jarrett, Wind Gap, Pa.

[73] Assignee: Air Products and Chemicals, Inc., Allentown, Pa.

[21] Appl. No.: 211,487

[22] Filed: Jun. 24, 1988

[51] Int. Cl.[4] .............................................. F16K 27/08

[52] U.S. Cl. ................................ 137/554; 137/382.5; 251/26; 251/29; 251/292; 60/413

[58] Field of Search .................... 60/413; 251/292, 29, 251/26, 27; 137/554, 382.5

[56] References Cited

U.S. PATENT DOCUMENTS

| | | | |
|---|---|---|---|
| 2,340,999 | 2/1944 | Trott | 137/139 |
| 2,352,140 | 6/1944 | Trott | 74/407 |
| 3,460,799 | 8/1969 | Santuary | 251/30 |
| 3,522,817 | 8/1970 | Raymond | 251/26 |
| 4,065,094 | 12/1977 | Adams | 251/26 |
| 4,120,478 | 10/1978 | Hasegawa | 251/26 |
| 4,280,373 | 7/1981 | Denkowski | 251/14 |
| 4,380,325 | 4/1983 | Palmer | 251/30 |
| 4,527,715 | 7/1985 | Rosenbaum | 222/61 |
| 4,629,157 | 12/1986 | Tsuchiya et al. | 251/292 |
| 4,637,423 | 1/1987 | Gray | 251/292 |

*Primary Examiner*—A. Michael Chambers

*Attorney, Agent, or Firm*—James C. Simmons; William F. Marsh

[57] ABSTRACT

An operator for remotely opening and closing the valve on a gas cylinder includes a metal frame having an enclosed upper portion, a support plate extending across the upper portion and a mounting wall extending downwardly from a side of the upper portion. On the mounting wall is a C-shaped clamp which is adapted to extend around and be secured to a non-cylindrical portion of the cylinder valve to secure the frame to the cylinder. On the mounting wall below the clamp is an additional clamping means which extends around a cylindrical portion of the cylinder to further secure the frame to the cylinder. A pneumatic activator is mounted on the support plate and has a shaft extending through an opening in the support plate in alignment with the valve stem of the cylinder valve. A coupling member is on the shaft and connects the shaft to the valve stem. A pneumatic circuit is connected to the actuator and includes means for remotely operating the actuator to rotate the actuator shaft so as to open and close the cylinder valve. A reserve cylinder of gas is connected to the pneumatic circuit to provide a flow of gas which automatically operates the activator to close the cylinder valve in the event of disruption of the main source of operating gas to the pneumatic circuit.

20 Claims, 7 Drawing Sheets

REMOTELY CONTROLLED OPERATOR FOR GAS CYLINDER VALVE

FIELD OF THE INVENTION

The present invention relates to a remotely controlled operator for a gas cylinder valve, and. more particularly to a remotely controlled operator for a valve having a rotating stem which requires a high torque to turn, such as used for gas cylinders containing corrosive gases.

BACKGROUND OF THE INVENTION

Gases under pressure are generally supplied in a cylinder having a valve at its top and which is operated by a rotating valve stem to open and close the valve. Some of the valves, particularly those on cylinders containing a non-corrosive material and which have low torque requirements, have a handle provided on the valve stem to allow the valve to be opened and closed manually. Other valves, particularly those on cylinders containing a corrosive material and which have high torque requirements, are generally wrench operated. For cylinders which contain gases which are corrosive, toxic or are otherwise dangerous to the operator of the valve, manual operation of the valve is undesirable since it can be dangerous to the operator in the event that the valve leaks, explodes or otherwise allow the escape of the gas. Therefore, it would be desirable to have a controller for such valves which can be operated from a remote location. Heretofore, various types of remotely controlled operators for valves have been developed. Some such operators are shown in U.S. Pat. No. 2,352,140 to A. J. Trott, entitled "Power Operated Valve", issued June 20, 1944, U.S. Pat. No. 2,340,999 to A. J. Trott, entitled "Motor Operated Valve", issued Feb. 8, 1944, U.S. Pat. No. 4,280,373 to W. J. Denkowski, et al., entitled "Portable Drive Unit For Valve Actuator", issued July 28, 1981 and U.S. Pat. No. 4,380,325 to T. W. Palmer, entitled "Gas Operated Valve Actuator", issued Apr. 19, 1983. However, the operators shown in these patents are large and complicated and therefore not suitable for use on individual cylinders of gases. U.S. Pat. No. 3,460,799 to R. E. Sanctuary, entitled "Variable Torque Valve Actuator", issued Aug. 12, 1969 shows a simpler valve actuator. However, this actuator uses a linear pneumatic actuator that converts linear motion to rotary motion to operate the valve and uses a solenoid valve to direct flow of pneumatics for opening and closing.

More recently there has been developed an operator for a gas cylinder which is shown in U.S. Pat. No. 4,527,715 to L. A. Rosenbaum, entitled "Automatic Valve Shut-Off System", issued July 9, 1985. However, this operator has several problems. One problem is that it is coupled to a handle on the end of the valve stem. The valves used on cylinders of corrosive gases generally require a high torque, 25 to 50 foot-pounds, to operate the valve and are therefore wrench operated. Such high torques when passed through a handle could strip the handle and thereby prevent proper operation of the valve. Another problem arises from the fact that the operator uses a pneumatic activator which converts linear motion to rotary motion through a drive mechanism which projects radially from the device. This is not only a more complex mechanism which can easily become broken but also takes up room. Furthermore, the operator is clamped to a cylindrical portion of the cylinder and is subject to circumferential movement when a torque is being applied.

SUMMARY OF THE INVENTION

An operator for remotely actuating the valve stem of a valve on a gas cylinder includes a frame and means for securing the frame to a non-cylindrical portion of the valve. Pneumatic operating means is on the frame. The pneumatic operating means includes a housing mounted on the frame and a rotating shaft extending from the housing in alignment with the valve stem when the frame is mounted on the cylinder. The housing contains pneumatic means for rotating the shaft in either direction. A coupling is provided for connecting the shaft directly to the end of the valve stem, and means is provided for remotely operating the pneumatic means to selectively rotate the shaft in either direction.

DETAILED DESCRIPTION OF PREFERRED EMBODIMENT

Figure 1:
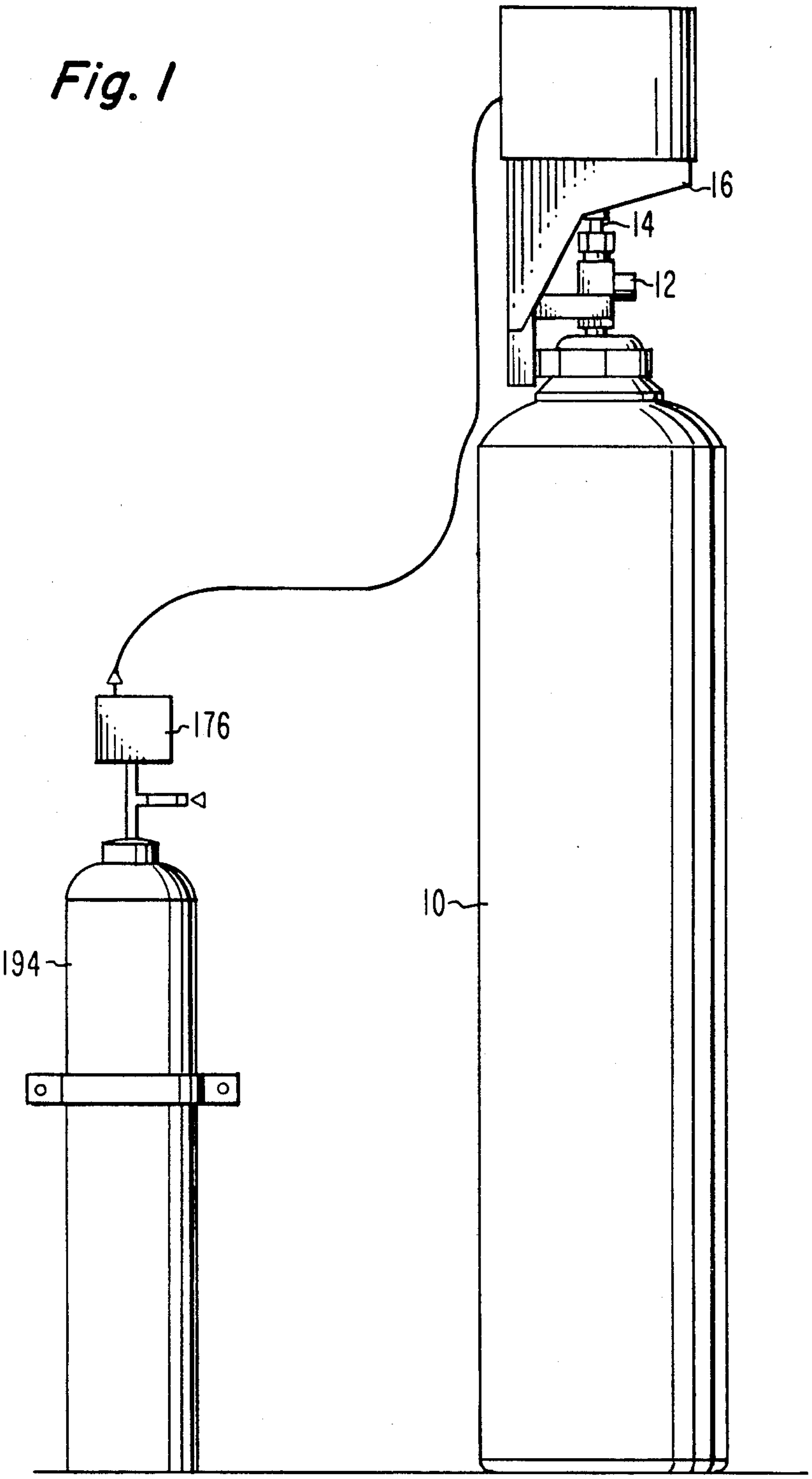
FIG. 1 is a side view of a gas cylinder having the valve operator of the present invention thereon.

Referring initially to FIG. 1, there is shown a cylinder 10 containing a gas under pressure and having a control valve 12 at its top which allows the flow of the gas from the cylinder 10. The valve 12 has a valve stem 14 projecting from its upper end by which the valve 12 is opened and closed. The remotely controlled valve operator 16 of the present invention is mounted on the cylinder 10 over the valve 12.

Figure 2:
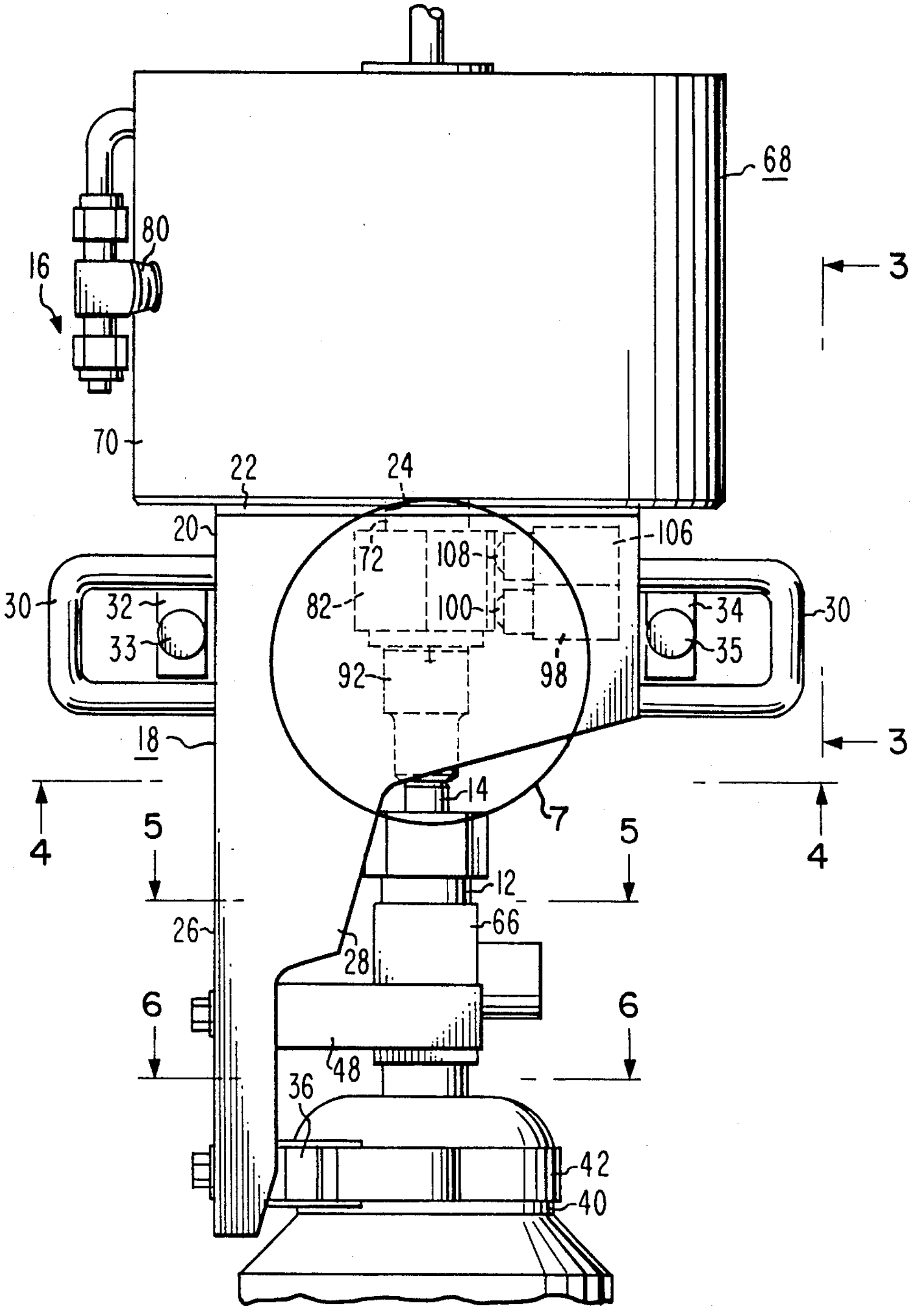
FIG. 2 is a side view of the valve operator.
Figure 3:
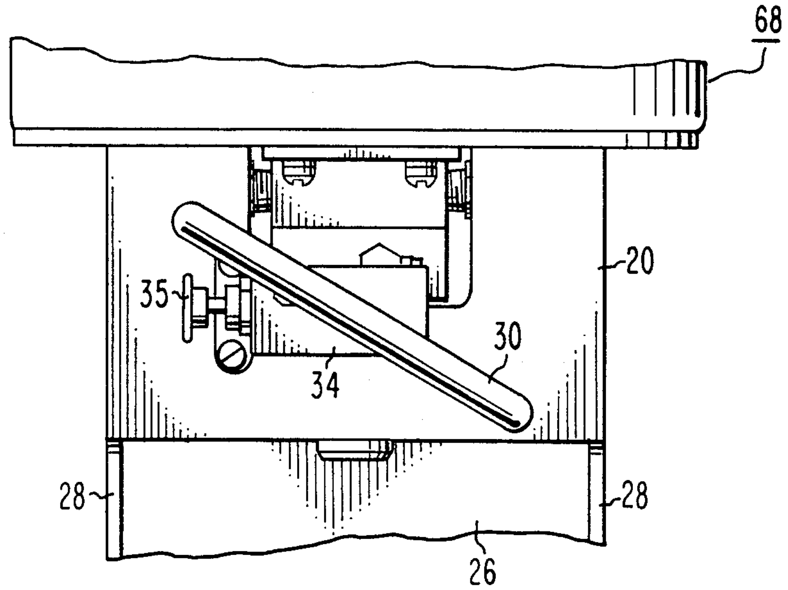
FIG. 3 is a front view of the operator taken along line 3—3 of FIG. 2.
Figure 4:
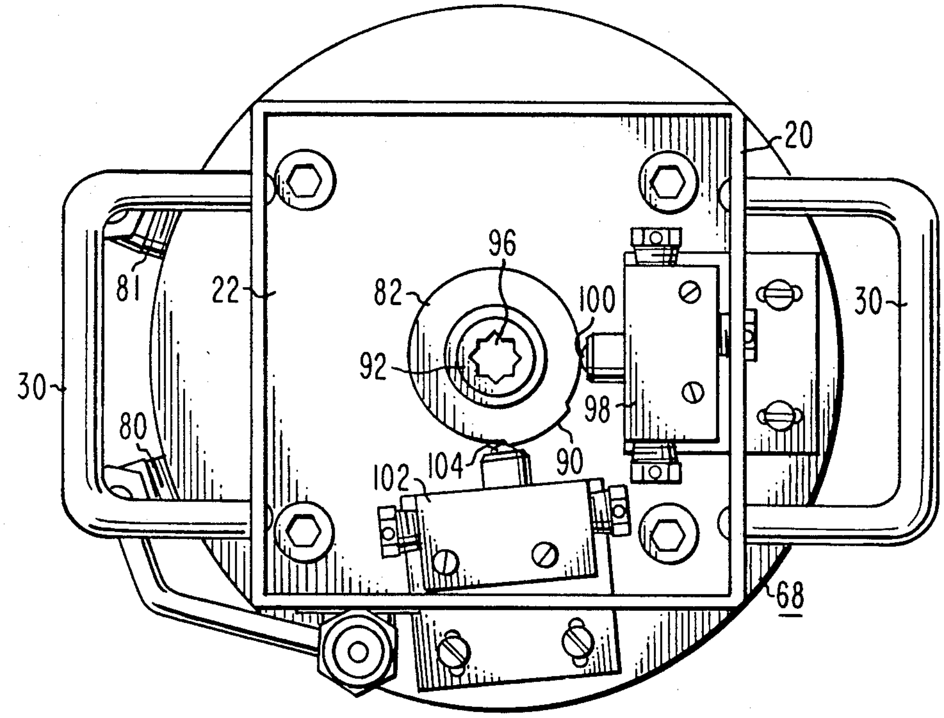
FIG. 4 is a sectional view taken along line 4—4 of FIG. 2.

As shown in FIG. 2, the valve operator 16 includes a metal frame 18 having a square upper portion 20, a support plate 22 extending across the top of the upper portion 20 and having a central hole 24 therethrough, a mounting wall 26 extending downwardly from one side of the upper portion 20 and substantially tapered side walls 28 extending downwardly from the sides of the upper portion 20 adjacent the mounting wall 26. As shown in FIGS. 2 and 4, a pair of U-shaped handles 30 are mounted on the outer surface of opposite sides of the upper portion 20 A separate switching valve 32 and 34 is mounted in each of the handles 30. The valves 32 and 34 have push button type operators 33 and 35 respectively. As will be explained later, the valves 32 and 34 are used when mounting and dismounting the operator 16 on the cylinder 10.

Figure 6:
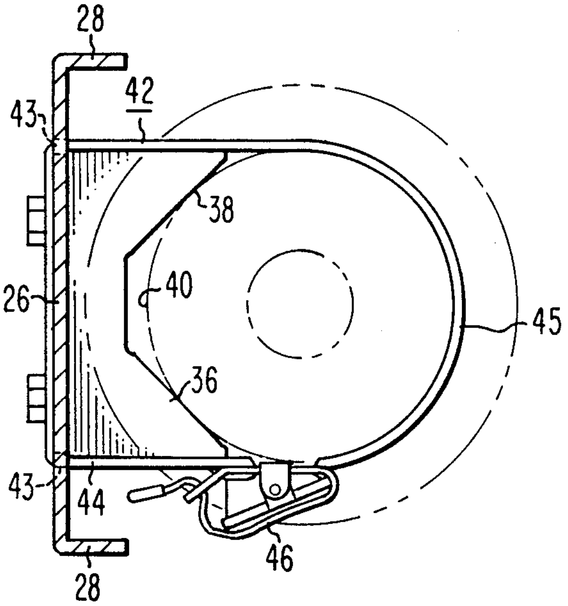
FIG. 6 is a sectional view taken along line 6—6 of FIG. 2.

As shown in FIGS. 2 and 6, a support block 36 is mounted on the inner surface of the mounting wall 26 at the bottom end thereof. The support block 36 has a substantially V-shaped notch 38 in its front surface which is adapted to receive a cylindrical surface 40 of the cylinder 10. An elongated clamping strap 42 extends across the outer surface of the mounting wall 26, through openings 43 in the mounting wall 26 and along the sides of the support block 36. One end 45 of the strap 42 is adapted to extend around the cylindrical surface 40 of the cylinder 10. The other end 44 of strap 42 has a clamping buckle 46 thereon. The clamping buckle 46 is adapted to receive the end 45 of the strap 42 so as to clamp the strap 42 tightly around the cylindrical surface 40 with the cylindrical surface 40 being clamped against the mounting block 36 within the notch 38.

Figure 5:
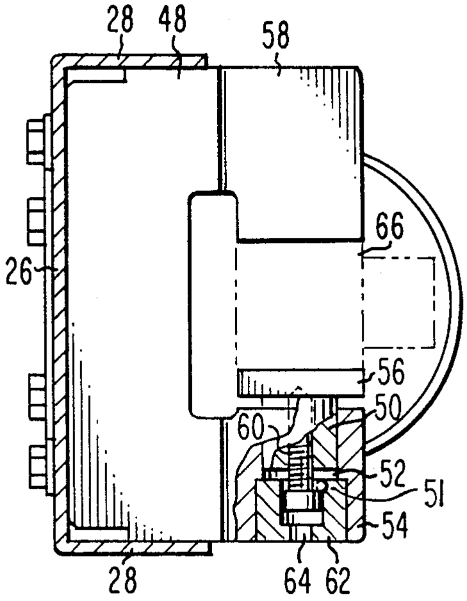
FIG. 5 is a sectional view taken along line 5—5 of FIG. 2.

As shown in FIGS. 2 and 5, a C-shaped clamp 48 is mounted on the inner surface of the mounting wall 26 above and spaced from the mounting block 36. A clamping plug 50 slidably fits in a passage 52 in one arm 54 of the clamp 48 and has a head 56 on its end facing the other arm 58 of the clamp 48. A socket head cap screw 60 is in the passage 52 and is threaded into the back end of the clamping plug 50. The assembly of clamping plug 50 and cap screw 60 is held in place by split pin 51. A plug 62 secured in the back end of the passage 52 has a small opening 64 therethrough which exposes the head of the screw 60. Thus, a wrench can be inserted through the opening 64 into the socket in the head of the screw 60 so as to rotate the screw 60 and thereby move the head 56 of the clamping plug 50 toward and away from the arm 58 of the clamp 48. The clamp 48 is positioned so that when the operator 16 is mounted on the cylinder 10, the clamping plug head 56 and arm 58 will be disposed along opposite flat surfaces of a non-cylindrical portion 66 of the valve 12. Thus, by rotating the screw 60 to move the clamping plug head 56 toward the arm 58, the clamp 48 can be tightly secured to the valve 12.

Figure 11:
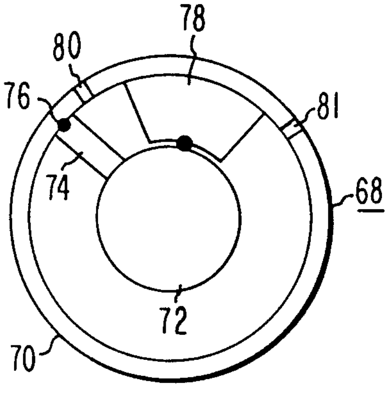
FIG. 11 is a schematic sectional view of the pneumatic actuator used in the valve operator.

A pneumatic activator 68 is mounted on the support plate 22 of the frame 18. The pneumatic activator 68 is a vane type rotary actuator of the type manufactured by The Sollami Company of Herrin, Ill. The activator 68 includes a cylindrical housing 70 having one end seated on the upper surface of the support plate 22. A rotary shaft 72 extends longitudinally along the axis of the housing 70 and projects from the one end of the housing. The shaft 72 extends through the hole 24 in the support plate 22 and is in axial alignment with the valve stem 14 when the operator 16 is mounted on the cylinder 10. As shown in FIG. 11, a vane 74 extends radially from the shaft 72 within the housing 70 and radially across the housing 70. A sealing ring 76 is provided along the edges of the vane 74 between the vane 74 and the inner surfaces of the outer wall and end walls of the housing 70. A stop 78 extends radially inwardly from the outer wall of the housing 70 so as to limit the rotation of the shaft 72 and vane 74 through an arc of about 280°. A pair of spaced gas inlet ports 80 and 81 extend through the housing 70 and open into opposite sides of the vane 74. Thus, when gas under pressure is admitted into the housing 70 at side of the vane 74, the vane 74 and shaft 72 are rotated in one direction, and when the gas is admitted into the housing 70 at the other side of the vane 74, the vane 74 and shaft 72 are rotated in the other direction.

Figure 8:
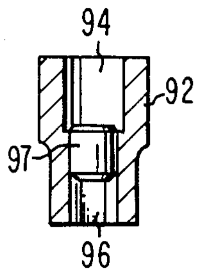
FIG. 8 is a sectional view of the coupling member of the coupling portion.
Figure 7:
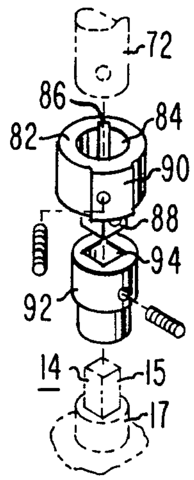
FIG. 7 is an exploded perspective view of the coupling portion within the circle 7 in FIG. 2.

As shown in FIGS. 2, 4 and 7, a cam member 82 has a recess 84 in one end which receives the end of the activator shaft 72. The cam member 82 is drivingly connected to the shaft 72 by a key 86 fitting into slots in the shaft 72 and the inner surface of the cam member 82. A non-circular lug 88 projects longitudinally from the cam member 82 and a camming projection 90 projects radially from the outer surface of the cam member 82. As shown in FIGS. 7 and 8, a coupling member 92 has a non-circular recess 94 in one end which receives the lug 88 of the cam member 82, and a non-circular recess 96 in its other end which opens into the recess 94 and receives the non-circular end 15 of the valve stem 14. A plug 97 of an elastomeric material fits tightly within the coupling member 92 and extends partially into each of the recesses 94 and 96. The plug 97 as shown in FIGS. 7 and 8 is compressed between the lug 88 and the valve stem 14 so as to space the end of the coupling member 92 a distance away from the shoulder 17. This provides room for longitudinal movement of the valve stem 14 when it is rotated to open the valve 12. Thus, the activator shaft 72 is drivingly connected to the valve stem 14 through the cam member 82 and the coupling member 92.

As shown in FIG. 4, a first pneumatic valve 98 is mounted on the upper portion 20 of the frame 18 and has a cam roller operator 100 projecting therefrom and positioned to be engaged by the camming projection 90 of the cam member 82. A second pneumatic valve 102 is mounted on the upper portion 20 of the frame 18 approximately 90° from the first valve 98. The second valve 102 has a cam roller operator 104 which also is positioned to be engaged by the camming projection 90 of the cam member 82. As shown in FIG. 2, a third pneumatic valve 106 is mounted in stacked relation with the first valve 98 and has a cam roller operator 108 which is adapted to be engaged by the camming projection 90 at the same time as the operator 100 of the first valve 98.

Figure 9:
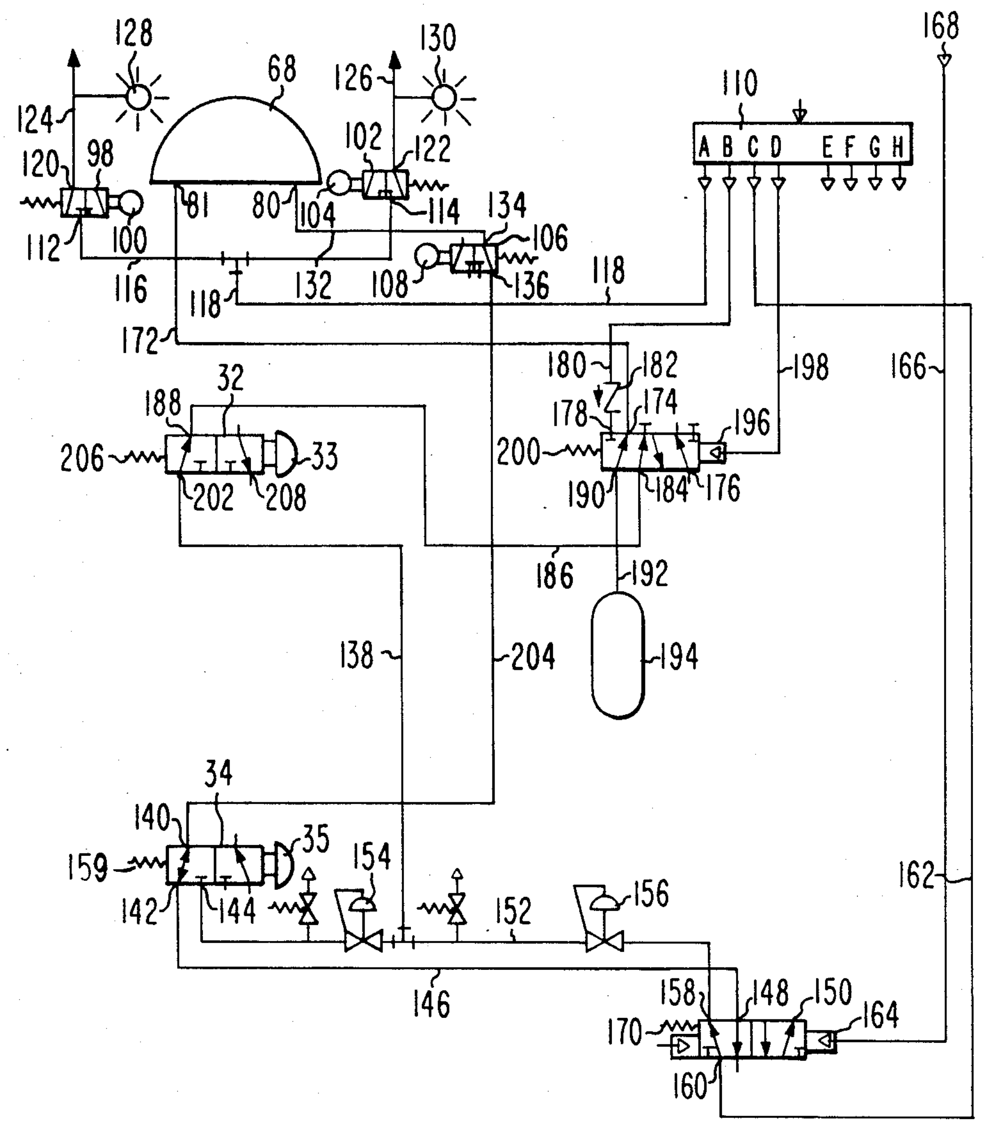
FIG. 9 is a schematic diagram of the pneumatic circuit for operating the valve operator of the present invention.

Referring to FIG. 9, there is shown the pneumatic circuit for operating the valve operator 16. The pneumatic circuit includes a bus manifold 110 which is connected to a supply of operating gas and has a plurality of outlet ports A through H to which various elements of the circuit are connected to receive a supply of the operating gas. The first and second valves 98 and 102, which are mounted adjacent the cam member 82, have their inlet ports 112 and 114 respectively connected to manifold outlet port A by lines 116 and 118. The outlet ports 120 and 122 of the first and second valves 98 and 102 respectively are connected by lines 124 and 126 respectively to pneumatically operated signals 128 and 130 respectively, such as a light, alarm or any other type of visual or audible signal. The first and second valves 98 and 102 are normally in a closed position. However, when the camming projection 90 of the cam member 82 engages the valve operator. 100 and 104 of either valve, the respective valve is opened allowing the flow of gas through the valve to its respective signal 128 and 130. The first valve 98 is positioned so that it is opened by the camming projection 90 when the actuator 68 is operated to open the cylinder valve 12. The second valve 102 is positioned so that it is opened by the camming projection 90 when (he actuator 68 is operated to close the cylinder valve 12.

The inlet port 80 of the activator 68 which is open to the side of the vane 74 which causes the activator shaft 72 to open the cylinder valve 12 is connected by a line 132 to the outlet port 134 of the third valve 106 mounted adjacent the cam member 82. The inlet port 136 of the third valve 106 is connected by a line 204 to the outlet port 140 of the valve 34 mounted on the handle 30. The third valve 106 is normally in its open condition. However, when the camming projection 90 engages the operator 100 of the first valve 98 it also engages the operator 108 of the third valve 106 and closes the third valve 106.

The valve 34 has two inlet ports 142 and 144. The inlet port 142 is connected by a line 146 to an outlet port 148 of a control valve 150. The inlet port 144 is connected by a line 152 through a pair of spaced pressure regulators 154 and 156 to another outlet port 158 of the control valve 150. The operator 35 of the valve 34 is normally held by a spring 159 in a position so that the outlet port 140 is connected to the inlet port 142. However, by pressing on the operator 35, the outlet port 140 can be connected to the inlet port 144 for reasons which will be explained.

The control valve 150 has an inlet port 160 which is connected by a line 162 to the outlet port C of the manifold 110. The operator 164 of the control valve 150 is connected by a line 166 to the control signal input 168. The control valve operator 164 is normally held by a spring 170 in a position which connects the inlet port 160 to the outlet port 58. However, a signal from the control signal input 168 moves the operator 164 to a position which connects the inlet port 160 to the outlet port 148.

The inlet port 81 of the activator 68 which is open to the side of the vane 74 which will cause the vane 74 to rotate the shaft 72 in a direction to close the cylinder valve 12 is connected by a line 172. e.g. a flexible metal line, to an outlet port 174 of a safety valve 176. The safety valve 176 has another inlet port 178 which is connected by a line 180 through a check valve 182 to the outlet port B of the manifold 110. The safety valve 176 has a first inlet port 184 connected by a line 186 to the outlet port 188 of the valve 32 on the handle 30. A second outlet port 190 of the safety valve 176 is connected by line 192, e.g. a rigid metal line, to a reserve cylinder 194 of operating gas under low pressure. The operator 196 of the safety valve 176 is connected by a line 198 to the outlet port D of the manifold 110. The pressure on the operator 196 normally holds the operator 196 in a position in which the inlet port 184 is connected to the outlet port 174 and the outlet port 190 is connected to the inlet port 178 so that the cylinder 194 is connected to the manifold 110. However, if the pressure of the gas from the manifold 110 drops or is cut off, a spring 200 moves the operator 196 to a position in which the outlet port 190 is connected to the outlet port 174 so that the reserve cylinder 194 is connected to the outlet port 174.

The valve 32 has an inlet port 202 connected by a line 138 to the line 152 at a point between the pressure regulators 154 and 156. Normally, a spring 206 holds the operator 33 in a position in which the inlet port 202 is connected to the outlet port 188. However, if the operator is pressed inwardly, the outlet port 188 is connected to a vent port 208.

Figure 10:
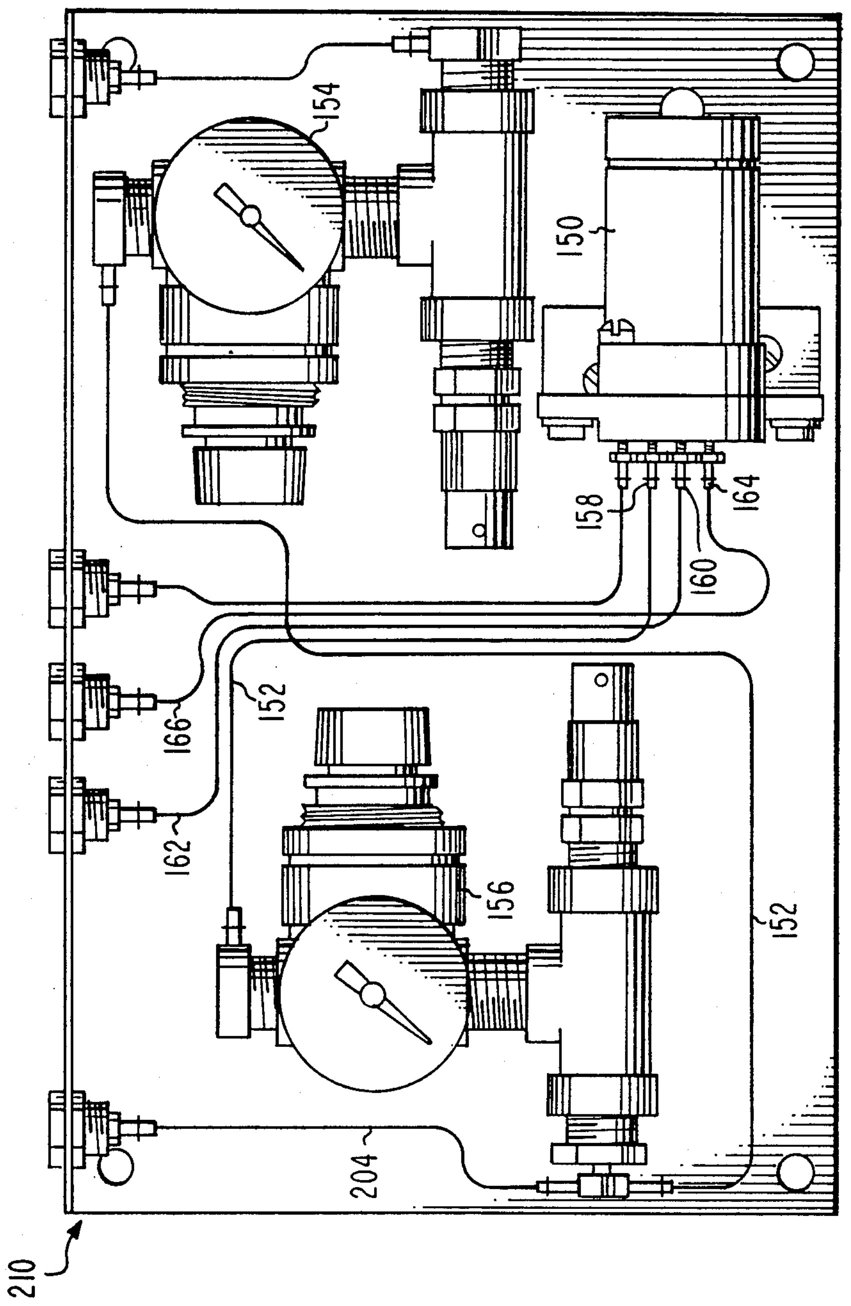
FIG. 10 is a front view of the pneumatic control box.

FIG. 10 shows the module 210 which contains a portion of the pneumatic control circuit. The module 210 contains the control valve 150 and the two pressure regulators 154 and 156 and can be mounted near the gas cylinder 10 shown in FIG. 1. As shown in FIG. 1, the safety valve 176 can be mounted directly on the reserve cylinder 194 which is also disposed near the gas cylinder 10.

To mount the valve operator 16 on the gas cylinder 10, the user lifts the valve operator 16 by the handles 30 and maneuvers it onto the cylinder valve 12. The user presses the operating button 33 of the valve 32 which connects the vent port 208 of the valve 32 to the output port 188 and thereby vents the actuator 68. At the same time, the user depresses and releases the operating button 35 of the valve 34 so as to intermittently connect the input port 144 of the valve 34 to the output port 140. This allows intermittent admission of gas into the open side inlet port 80 of the actuator 68 and thereby jog the actuator shaft 72. In order to ensure that the valve 12 is closed tightly before the vane 74 engages the stop 78 at the closing side of the actuator 68, the actuator shaft 72 is jogged until the vane 74 is away from the stop 78 and the recess 96 in the coupling member 92 on the end of the actuator shaft 72 is aligned with the valve stem 14. Thus, full closing torque can be applied to the valve stem 14 to fully close the valve 12 before the vane 74 reaches the stop 78. Since both the valves 32 and 34 are mounted on the handles 30, they can be easily operated by the thumbs of the user while the user is holding the operator 16 by the handles 30. While holding the valve 32 in its venting position, the operator 16 is lowered until the valve stem 14 is within the recess 96 in the coupling member 92. The mounting block 36 is adjusted so that it fits around a cylindrical surface 40 of the neck of the cylinder 10, and the clamp 48 is adjusted so that it extends around the non-cylindrical portion 66 of the valve 12. In the clamp 48, the screw 60 is rotated so as to move the head 56 of the plug 50 toward the valve 12 and thereby clamp the clamp 48 tightly around the valve 12. The clamping strap 42 is placed around the cylindrical surface 40 and inserted into buckle 46 so as to be clamped tight around the cylindrical surface. This tightly clamps the frame 18 to the cylinder 10 and valve 12 with the actuator shaft 72 being drivingly connected to the valve stem 14.

When the operator 16 is mounted on the cylinder 10, the cylinder valve 12 is closed. As a normal operating condition, gas from the manifold 110 has already been applied to the operator 196 of the safety valve 176 through line 198 moving the operator 196 to a position where the input port 184 is connected to the output port 174. This connects the activator close input port 81 to the manifold 110 through the line 172, safety valve 176. line 186. valve 32, line 138. line 152. control valve 150 and line 162. Also. in the safety valve 176. the outlet port 190 becomes connected to the inlet port 178 so that the reserve cylinder 194 is connected to the manifold 110 through the check valve 182. This maintains the reserve cylinder 194 filled with the operating gas at a desired low operating gas pressure.

To open the cylinder valve 12, the control signal 168 is operated to allow a flow of gas to pass through the line 166 to the operator 164 of the control valve 150. This moves the operator 164 to a position where the input port 160 is connected to the output port 148. This connects the actuator open input port 80 to the manifold 110 through the line 132, shutoff valve 106, line 204, valve 34, line 146, control valve 150 and line 162. The gas applied to the activator 68 through the open input port 80 causes the vane 74 to rotate and thereby rotate the shaft 72 and valve stem 14 in the direction to open the valve 12. When the actuator shaft 72 is rotated so that the valve 12 is open, the camming projection 90 on the cam member 82 will engage the operator 100 of the first valve 98 and the operator 108 of the third valve 106. This moves the operator 108 of the third valve 106 to a position so as to cut off the flow of gas through the third valve 106 and thereby stop the rotation of the actuator shaft 72 with the valve 12 in its open condition. When the camming projection 90 engages the operator 100 of the first valve 98 it moves the operator 100 so as to connect the input port 112 to the output port 120. This allows gas from the manifold 110 to flow through the line 118 and 116, through the valve 98 and the line 124 to the signal 128 to provide a signal that the cylinder valve 12 is in its open condition.

To close the cylinder valve 12, the gas pressure to the operator 164 of the control valve 150 from the control signal 168 is cut off and vented allowing the spring 170 to move the operator 164 to its position where the input port 160 is connected to the output port 158. This reconnects the actuator close input port 81 to the manifold 110 allowing the gas to enter the activator 68 and move the vane 74 in the direction to rotate the shaft 72 and the valve stem 14 to the closed position of the valve 12. When the activator shaft 72 moves the valve stem 14 to its closed position, the camming projection 90 of the cam member 82 is moved to engage the operator 104 of the second valve 102 and thereby connect the input port 114 to the output port 122 of the second valve 102. This allows the flow of gas from the manifold 110 to the signal 130 and thereby provide a signal that the cylinder valve 12 is closed.

In the operation of the activator 68, the pressure to the close inlet port 81 of the activator is controlled by the pressure regulator 156 so that it does not substantially exceed the torque required to close the valve 12 and does not damage the seating of the end of the valve stem 14 against the valve seat in the valve 12. However, the pressure to the open inlet port 80 is the full manifold pressure so as to provide sufficient torque to break the end of the valve stem 14 away from the valve seat and thereby open the valve 12. During the mounting of the operator 16 on the cylinder 10, the pressure used during the jogging of the actuator 68 is additionally controlled by the regulator 154 so that only small movements of the activator shaft 72 are obtained.

In the event that the pressure in the manifold 110 is cut off for any reason, the gas pressure on the safety valve operator 196 is stopped. This allows the spring 200 to move the operator 196 to a position where the outlet port 190 is connected to the output port 174. This connects the reserve cylinder 194 directly to the close input port 81 of the activator 68, and automatically causes the activator shaft 72 to be rotated so as to close the valve 12. Thus, any disruption and loss in the control gas for the operator 16 automatically causes the cylinder valve 12 to be closed so that there can be no damage to the cylinder valve 12 or loss of gas from the cylinder 10. Once the flow of operating gas to the manifold 110 is restarted, the operator 16 will go back to normal operation, and the reserve cylinder 194 will be automatically refilled with gas to be available in case of another break-down in the operating gas flow.

In addition, in the event that pneumatic signal 168 is stopped and vented, either for planned control purposes or is lost inadvertently. operator 164 will lose pressure and spring 170 will move the operator 164 to a position that will connect port 160 of valve 150 to port 158. The pneumatic supply from manifold 110 is then directed through the regulator 156, line 152. line 138, valve 32, line 186, valve 176 and line 172 to port 81 of the actuator 68. This action will cause the vane 74 to move shaft 72 in a direction to close valve 12. This failsafe feature closes valve 12 in the event signal 168 is lost, due to electrical power failure, if signal 168 is electrically activated through a solenoid, or due to pneumatic signal failure. Restoration of positive pressure control signal 168 will cause operator 16 to open valve 12 for normal operation.

Thus, there is provided by the present invention an operator for opening and closing the valve on a gas cylinder from a remote location. The operator is connected directly to the valve stem of the gas cylinder valve so a high torque can be applied to the valve stem to open or close the valve without damaging the valve. In addition, the operator is provided with a reserve cylinder of gas to allow the operator to automatically close the cylinder valve in the event that the operating gas flow is disrupted. This prevents any chance of a loss of the gas in the cylinder while the operator cannot be operated because of loss of the operating gas.

What is desired to be secured by Letters Patent of the United States is set forth in the appended claims.

What is claimed is:

1. An operator for the valve of a gas cylinder adapted to be mounted on the cylinder and to be remotely activated for rotating the valve stem of the valve between an open and closed position comprising:

- a frame adapted to be mounted on the gas cylinder:
- means for clamping the frame to a non-cylindrical portion of the valve;
- pneumatic activating means having a housing mounted on the frame, a rotary shaft projecting from the housing in alignment with the valve stem when the frame is mounted on the cylinder and pneumatic means in said housing for selectively rotating said shaft in either direction;
- means connected to the end of the shaft and adapted to receive the end of the valve stem; and
- means for remotely operating the pneumatic means to selectively rotate the shaft in either direction.

2. An operator in accordance with claim 1 including additional means for securing the frame to a cylindrical surface of the cylinder.

3. An operator in accordance with claim 2 including a pneumatic circuit connected to said pneumatic activating means to operate said activating means and connected to a main source of operating gas.

4. An operator in accordance with claim 3 including a reserve cylinder of operating gas connected to said pneumatic circuit to supply operating gas to the activating means in the event of a disruption of the operating gas from said main source, and means for connecting the reserve cylinder to said activating means upon the disruption of the operating gas from said main source so as to operate the activating means in a manner to close the cylinder valve.

5. An operator in accordance with claim 4 in which the means for connecting the reserve cylinder to the activator includes a safety valve having an outlet port connected to the activator, a first inlet port connected to the main source of operating gas, a second inlet port connected to said reserve cylinder, and means normally connecting the first inlet port to the outlet port by which switches the valve to have the second inlet port connected to the outlet port in the event of the disruption of the operating gas from the main source.

6. An operator in accordance with claim 5 in which the safety valve includes an operator which is adapted to switch the connection between the outlet port and each of the inlet ports, said operator being connected to said main source of operating gas which normally maintains the operator in a position with the first inlet port being connected to the outlet port but allows the operator to switch to a position in which the second inlet port is connected to the outlet port upon disruption of the operating gas from the main source.

7. An operator in accordance with claim 4 in which the frame includes an enclosed upper portion having a support plate extending there across and a mounting wall extending downwardly from a side of the upper portion, the activating means is mounted on the support plate, the additional means for securing the frame to the cylinder is adjacent the bottom end of the mounting wall and the means for securing the frame to the valve is on the mounting wall above the additional mounting means.

8. An operator in accordance with claim 7 in which the support wall has a hole therethrough, and the shaft of the activating means extends through the hole.

9. An operator in accordance with claim 8 in which the means for connecting the frame to the non-cylindrical portion of the valve include a C-shaped clamp having arms adapted to extend along opposed flat sides of the valve, a plug slidably mounted in a passage in one of said arms for movement toward and away from the other arm, and screw means in said one arm for moving the plug toward and away from the arm to clamp the arms to the valve.

10. An operator in accordance with claim 9 in which the additional clamping means includes a block mounted on the mounting wall of the frame and having a substantially V-shaped notch in its end which is adapted to fit around the cylindrical surface of the cylinder, clamping straps secured to the block and adapted to extend around the cylinder, and a buckle for securing the straps together tightly around the cylinder.

11. An operator in accordance with claim 8 in which the means for connecting the shaft to the valve stem includes a cam member on the end of the shaft having a camming projection extending radially therefrom and a coupling member on the cam member and having a non-cylindrical recess adapted to receive the end of the valve stem.

12. An operator in accordance with claim 11 including a pair of valves mounted on the upper portion of the frame and having operators which are adapted to be engaged by the camming projection when the shaft has rotated the valve stem to its open and closed positions respectively, each of said valves being connected between the main source of operating gas and a pneumatically operated signal so that when the camming projection engages the operator of the respective valves a signal will be given to indicate that the cylinder valve is open or closed.

13. An operator in accordance with claim 12 in which the actuator housing has an open inlet port and a close inlet port through which gas can pass into the actuator to open and close the cylinder valve, each of said ports being connected to the main source of operating gas through a control valve which is adapted to selectively connect each of the inlet ports to the gas supply to selectively open and close the cylinder valve.

14. An operator in accordance with claim 13 in which the control valve includes an inlet port connected to the main supply of operating gas, a pair of outlet ports each connected to a separate one of the inlet ports of the activator, and an operator adapted to switch the connection between the inlet port and each of the outlet ports, said operator being connected to the means for remotely operating the actuating means.

15. An operator in accordance with claim 14 in which a third valve is mounted on the frame and has an operator which is engaged by the camming projection when the activator shaft turns the cylinder valve to its open position, said third valve being connected between the open inlet port of the actuator and the control valve and adapted to shut off the flow of gas to the open inlet port of the actuator when the cylinder valve is opened.

16. An operator in accordance with claim 15 including a safety valve connected between the close inlet port of the actuator and its respective outlet port of the control valve, said reserve cylinder being connected to said safety valve and the safety valve having means for switching the close inlet port of the activator to the reserve cylinder in the event of disruption of the main source of the operating gas so as to automatically close the cylinder valve.

17. An operator in accordance with claim 16 including a pressure regulator in the connection between the control valve and the close inlet port of the actuator to control the pressure of the gas to the close inlet port of the activator.

18. An operator in accordance with claim 17 including a venting valve connected between the close inlet port of the actuator and its respective outlet port of the control valve, said venting valve including manually operated means for selectively venting the actuator 19. An operator in accordance with claim 18 including a jog-open valve connected between the open inlet valve of the actuator and its respective outlet port of the control valve, said jog-open valve including manually operated means for selectively connecting the open inlet port of the activator to the main source of operating gas to jog the shaft of the activator.

20. An operator in accordance with claim 19 in which the frame has a pair of handles thereon for carrying the operator, and the means for manually operating each of the venting valve and the jog-open valve is a separate push button mounted on a separate one of the handles.

* * * * *